US011913477B2

(12) United States Patent
Hutcheson et al.

(10) Patent No.: US 11,913,477 B2
(45) Date of Patent: Feb. 27, 2024

(54) CONTROLLER AND METHOD FOR HYDRAULIC APPARATUS

(71) Applicant: DANFOSS SCOTLAND LIMITED, Edinburgh (GB)

(72) Inventors: John Hutcheson, Edinburgh (GB); Daniel Abrahams, Edinburgh (GB)

( * ) Notice: Subject to any disclaimer, the term of this patent is extended or adjusted under 35 U.S.C. 154(b) by 0 days.

(21) Appl. No.: 17/954,168

(22) Filed: Sep. 27, 2022

(65) Prior Publication Data

US 2023/0139226 A1 May 4, 2023

(30) Foreign Application Priority Data

Oct. 29, 2021 (EP) .................................... 21205730

(51) Int. Cl.
*F15B 11/024* (2006.01)
*F15B 11/16* (2006.01)
(Continued)

(52) U.S. Cl.
CPC ............ *F15B 11/024* (2013.01); *E02F 3/422* (2013.01); *E02F 9/2228* (2013.01);
(Continued)

(58) Field of Classification Search
CPC .......... F15B 11/006; F15B 2211/30575; F15B 2211/30515; F15B 2211/3058;
(Continued)

(56) References Cited

U.S. PATENT DOCUMENTS

| | | | |
|---|---|---|---|
| 3,771,554 | A | 11/1973 | Hassall |
| 4,555,974 | A | 12/1985 | Mason et al. |

(Continued)

FOREIGN PATENT DOCUMENTS

| | | |
|---|---|---|
| DE | 102013221683 | 4/2015 |
| EP | 2703652 | 3/2014 |

(Continued)

OTHER PUBLICATIONS

Heybroek, Kim & Palmberg, Jan-Ove & Lillemets, Johan & Lugnberg, Martin & Ousbäck, Martin. (2022). Evaluating a Pump Controlled Open-Circuit Solution. Paper No. 24.

(Continued)

*Primary Examiner* — Dustin T Nguyen
(74) *Attorney, Agent, or Firm* — Snell & Wilmer L.L.P.

(57) ABSTRACT

The present invention provides a controller for a hydraulic apparatus. The controller is configured to determine (410) that a mode change criteria has been met for the hydraulic apparatus. In response to the determination, the controller is configured to control (420) a valve arrangement to change a first actuator chamber of a hydraulic actuator between being fluidly connected to a hydraulic machine and fluidly isolated from a second chamber of the hydraulic actuator, and being fluidly connected to both the second actuator chamber and the hydraulic machine. Further in response to the determination, the controller is configured to control (430) the hydraulic machine to change a flow rate of hydraulic fluid flowing through the hydraulic machine to regulate a movement of the hydraulic actuator during the control of the valve arrangement.

13 Claims, 4 Drawing Sheets

(51) Int. Cl.

| | |
|---|---|
| ***F15B 11/00*** | (2006.01) |
| ***F15B 13/02*** | (2006.01) |
| ***F15B 15/20*** | (2006.01) |
| ***F15B 21/08*** | (2006.01) |
| ***F15B 13/06*** | (2006.01) |
| ***E02F 9/22*** | (2006.01) |
| ***E02F 3/42*** | (2006.01) |

(52) U.S. Cl.
CPC .......... *E02F 9/2235* (2013.01); *E02F 9/2242* (2013.01); *F15B 11/006* (2013.01); *F15B 11/16* (2013.01); *F15B 13/02* (2013.01); *F15B 13/06* (2013.01); *F15B 15/20* (2013.01); *F15B 21/082* (2013.01); *F15B 2211/20546* (2013.01); *F15B 2211/20569* (2013.01); *F15B 2211/20576* (2013.01); *F15B 2211/265* (2013.01); *F15B 2211/3058* (2013.01); *F15B 2211/30515* (2013.01); *F15B 2211/30575* (2013.01); *F15B 2211/3138* (2013.01); *F15B 2211/3144* (2013.01); *F15B 2211/411* (2013.01); *F15B 2211/413* (2013.01); *F15B 2211/426* (2013.01); *F15B 2211/50518* (2013.01); *F15B 2211/55* (2013.01); *F15B 2211/625* (2013.01); *F15B 2211/63* (2013.01); *F15B 2211/633* (2013.01); *F15B 2211/6652* (2013.01); *F15B 2211/6654* (2013.01); *F15B 2211/6658* (2013.01); *F15B 2211/7053* (2013.01); *F15B 2211/7107* (2013.01); *F15B 2211/7128* (2013.01); *F15B 2211/75* (2013.01); *F15B 2211/761* (2013.01)

(58) Field of Classification Search
CPC .......... F15B 2211/411; F15B 2211/413; F15B 2211/426; F15B 2211/55; F15B 2211/63; F15B 2211/6652; F15B 2211/6658; F15B 2211/7053; F15B 2211/7107; F15B 2211/7128; F15B 211/75; F15B 211/761; F15B 211/20546; F15B 211/20569; F15B 211/20576; F15B 211/265; F15B 211/327; F15B 211/50518; F15B 211/5159; F15B 211/625; F15B 211/6306; F15B 211/6313; F15B 211/633; F15B 211/6346; F15B 211/6654; F15B 11/024; F15B 11/16; F15B 21/082; E02F 9/2228; E02F 9/2235; E02F 9/2242; E02F 3/422
See application file for complete search history.

(56) References Cited

U.S. PATENT DOCUMENTS

| | | | | |
|---|---|---|---|---|
| 4,767,292 | A * | 8/1988 | Kinder | F04C 2/105 418/61.3 |
| 5,305,789 | A | 4/1994 | Rivolier | |
| 6,681,571 | B2 * | 1/2004 | Bailey | F04B 49/03 60/489 |
| 6,705,079 | B1 * | 3/2004 | Tabor | F15B 11/006 60/469 |
| 7,251,935 | B2 | 8/2007 | Zhang et al. | |
| 8,096,227 | B2 * | 1/2012 | Brickner | F15B 11/024 91/454 |
| 8,635,939 | B2 * | 1/2014 | Linjama | F04B 49/22 91/465 |
| 8,920,575 | B2 * | 12/2014 | Hopponen | F15B 21/041 134/22.12 |
| 8,944,788 | B2 * | 2/2015 | Armstrong | F04C 14/065 418/61.3 |
| 9,382,694 | B2 | 7/2016 | Kim et al. | |
| 9,429,152 | B2 | 8/2016 | Yamaji | |
| 9,841,037 | B2 | 12/2017 | Tho et al. | |
| 10,066,368 | B2 | 9/2018 | Hijikata et al. | |
| 10,125,750 | B2 * | 11/2018 | Pfaff | F04B 1/04 |
| 10,161,423 | B2 * | 12/2018 | Rampen | F15B 11/162 |
| 10,914,328 | B2 * | 2/2021 | Ogawa | E02F 9/226 |
| 11,022,153 | B2 | 6/2021 | Green et al. | |
| 11,313,105 | B2 | 4/2022 | Ogawa et al. | |
| 11,384,510 | B2 * | 7/2022 | Jagoda | E02F 9/2207 |
| 11,441,549 | B2 * | 9/2022 | Dole | F04B 49/007 |
| 2013/0061588 | A1 | 3/2013 | Jagoda | |
| 2014/0325972 | A1 * | 11/2014 | Ma | F15B 21/14 60/413 |
| 2015/0059568 | A1 | 3/2015 | Williamson et al. | |
| 2016/0061236 | A1 | 3/2016 | Tho et al. | |
| 2016/0290370 | A1 | 10/2016 | Tho et al. | |
| 2017/0059057 | A1 | 3/2017 | Yamaji | |
| 2018/0100521 | A1 | 4/2018 | Richer | |
| 2018/0252243 | A1 | 9/2018 | Pfaff et al. | |
| 2019/0024677 | A1 | 1/2019 | Rannow | |
| 2020/0080551 | A1 * | 3/2020 | Caldwell | G05B 19/46 |
| 2021/0332562 | A1 | 10/2021 | Ogawa et al. | |
| 2022/0049462 | A1 | 2/2022 | Caldwell et al. | |

FOREIGN PATENT DOCUMENTS

| | | | |
|---|---|---|---|
| EP | 2795003 | B1 | 1/2017 |
| EP | 2851565 | | 1/2017 |
| EP | 2977515 | | 8/2020 |
| EP | 3832030 | | 6/2021 |
| JP | H1047306 | | 2/1998 |
| JP | 2007205464 | | 8/2007 |
| JP | 2011094687 | | 5/2011 |
| JP | 2013148174 | | 8/2013 |
| JP | 5336558 | | 11/2013 |
| JP | 2016075303 | | 5/2016 |
| WO | 2012057241 | | 5/2012 |
| WO | 2013095208 | A1 | 6/2013 |
| WO | 2017046401 | | 3/2017 |
| WO | 2020170540 | | 8/2020 |
| WO | 2021044148 | | 3/2021 |

OTHER PUBLICATIONS

USPTO, Non-Final Office Action dated May 10, 2023 in U.S. Appl. No. 17/870,653.

Pellegri et al., “Applying a Multi-Service Digital Displacement® Pump to an Excavator to Reduce Valve Losses”. Group 3 Novel displacement machines. 12th International Fluid Power Conference. Dresden 2020 [pp. 59-68].

Bosch Rexroth, “VBO Virtual Bleed Off”, [online] [retrieved on Jul. 20, 2022] retrieved from Rexroth, a Bosch Company using the internet <URL:https://www.boschrexroth.com/en/xc/products/product-groups/mobile-hydraulics/systems-and-functional-modules/virtual-bleed-off-vbo/function/index>, 2 pages.

Axin et al., “Design Rules for High Damping in Mobile Hydraulic Systems”, Division of Fluid and Mechatronic Systems, Department of Management and Engineering, Linköping University, Sweden. The 13th Scandinavian International Conference on Fluid Power, SICFP2013, Jun. 3-5, 2013, Linköping, Sweden, pp. 13-20.

Choonshik Joo, “Application of Power Regenerative Boom system to excavator”, Group 10—Mobile Hydraulics Paper 10-3, 10th International Fluid Power Conference. Dresden 2016, pp. 175-184.

Bosch Rexroth, “Bosch Rexroth sets new standards for excavators”, [online] [retrieved on Jul. 21, 2022] retrieved from Rexroth, a Bosch Company using the internet <URL: https://www.boschrexroth.com/en/xc/company/press/index2-2564>, 3 pages.

* cited by examiner

CONTROLLER AND METHOD FOR HYDRAULIC APPARATUS

FIELD OF THE INVENTION

The present invention relates to a controller for a hydraulic apparatus, such as a vehicle, and to a method of controlling such hydraulic apparatus.

BACKGROUND TO THE INVENTION

Hydraulic actuators sometimes comprise a first hydraulic chamber having a first movable working surface and a second hydraulic chamber having a second movable working surface. Such a hydraulic actuator may be referred to as a double-acting hydraulic actuator. The first hydraulic chamber and the second hydraulic chamber are separated by a movable baffle, each face of the movable baffle defining the first and second working surfaces respectively. In this way, under pressure, the first working surface typically acts to cause movement in an opposite direction to the second working surface. Often, an effective working area of the first working surface is different to the effective working area of the second working surface. In one example of a double-acting hydraulic actuator as a hydraulic cylinder, a rod extends from the second working surface, through the second hydraulic chamber, and the baffle is a piston. As a result, the cross section of the rod reduces the effective working area of the second hydraulic chamber which is less than the effective working area of the first hydraulic chamber.

Sometimes, a hydraulic machine, such as a hydraulic pump, a hydraulic motor, or a hydraulic pump-motor will be in fluid communication with the first hydraulic chamber, with the second hydraulic chamber instead in fluid communication with a low pressure hydraulic reservoir. The hydraulic actuator can be moved in a first sense by pumping hydraulic fluid into the first hydraulic chamber, and permitted to move in a second sense, opposite the first sense, by motoring with hydraulic fluid from the first hydraulic chamber. It may be that this is referred to as "normal" mode.

In another mode of operation, it is known to have the hydraulic machine in fluid communication with both the first hydraulic chamber and the second hydraulic chamber, such that the first hydraulic chamber is in fluid communication with the second hydraulic chamber. This may be referred to as a "differential" mode. When the hydraulic actuator is operated such that the volume of the first hydraulic chamber decreases, in differential mode, some of the hydraulic fluid from the first hydraulic chamber is directed towards the second hydraulic chamber instead of the hydraulic machine. Because the effective working area of the first hydraulic chamber is greater than the effective working area of the second hydraulic chamber, the volume of the second hydraulic chamber increases more slowly than the volume of the first hydraulic chamber decreases. As a result, not all of the hydraulic fluid from the first hydraulic chamber can be directed towards the second hydraulic chamber, and the remainder can be directed towards the hydraulic machine. In this way, when the hydraulic actuator is operating in differential mode, it will be appreciated that the same flowrate of hydraulic fluid through a hydraulic machine can support a faster movement of the hydraulic actuator.

In differential mode, the maximum load which can be handled by the hydraulic actuator may be less than when the first hydraulic chamber is fluidly isolated from the second hydraulic actuator.

It is in this context that the present inventions have been devised.

SUMMARY OF THE INVENTION

In accordance with an aspect of the present disclosure, there is provided a controller for a hydraulic apparatus. The hydraulic apparatus comprises: a prime mover; a hydraulic circuit through which hydraulic fluid can flow; and a hydraulic machine in the hydraulic circuit and having a rotatable shaft in driven engagement with the prime mover. The hydraulic machine is configured such that, in operation, the hydraulic machine exchanges energy with the hydraulic circuit and the prime mover by movement hydraulic fluid between the hydraulic machine and the hydraulic circuit and via movement of the rotatable shaft. The hydraulic apparatus further comprises at least one hydraulic actuator having at least a first actuator chamber and a second actuator chamber. Each actuator chamber is in the hydraulic circuit. The at least one hydraulic actuator is to be used in a hydraulic work function of the hydraulic apparatus. The first actuator chamber is partially defined by a first actuator working surface and the second actuator chamber is partially defined by a second actuator working surface, the second actuator working surface arranged to act at least partially in opposition to the first actuator working surface. The hydraulic apparatus further comprises a valve arrangement in the hydraulic circuit for selectively routing the hydraulic fluid between the first actuator chamber and one or more of: the hydraulic machine; and the second actuator chamber. The valve arrangement is also for selectively routing the hydraulic fluid between the second actuator chamber and one or more of: the first actuator chamber; and a low pressure fluid reservoir.

The controller is configured to: determine that a mode change criteria has been met for the hydraulic apparatus; and in response to said determination: control the valve arrangement to change the first actuator chamber between being fluidly connected to the hydraulic machine and fluidly isolated from the second actuator chamber, and the first actuator chamber being fluidly connected to both the second actuator chamber and the hydraulic machine. Further in response to said determination, the controller is configured to control the hydraulic machine to change a flow rate of hydraulic fluid flowing through the hydraulic machine and a portion of the hydraulic circuit in fluid communication with the first actuator chamber, to thereby regulate a movement (i.e. position, or a derivative thereof) of the at least one hydraulic actuator during the control of the valve arrangement.

The controller may comprise one or more processors and a memory configured to store instructions which when executed by the one or more processors cause the hydraulic apparatus to carry out the functions of the controller described herein. The memory may be non-transitory, computer readable memory. The memory may have the instructions stored thereon. The present invention extends to a non-transitory computer-readable medium (e.g. memory) having the instructions stored thereon to control the apparatus as described herein. The memory may be solid-state memory. The controller may be provided in a single device. In other example, the controller may be distributed, having a plurality of processors. A first processor may be separated from a second processor in a distributed manner.

Viewed from another aspect, there is provided a method of controlling a hydraulic apparatus to operate as the controller is configured.

Specifically, there is provided a method of controlling a hydraulic apparatus, the hydraulic apparatus comprising: a prime mover; a hydraulic circuit through which hydraulic fluid can flow; a hydraulic machine in the hydraulic circuit and having a rotatable shaft in driven engagement with the prime mover. The hydraulic machine is configured such that, in operation, the hydraulic machine exchanges energy with the hydraulic circuit and the prime mover by flow of hydraulic fluid between the hydraulic machine and the hydraulic circuit and via movement of the rotatable shaft. The hydraulic apparatus further comprises at least one hydraulic actuator having at least a first actuator chamber and a second actuator chamber. Each actuator chamber is in the hydraulic circuit. The at least one hydraulic actuator is to be used in a hydraulic work function of the hydraulic apparatus. The first actuator chamber is partially defined by a first actuator working surface and the second actuator chamber is partially defined by a second actuator working surface, the second actuator working surface arranged to act at least partially in opposition to the first actuator working surface. The hydraulic apparatus further comprises a valve arrangement in the hydraulic circuit for selectively routing the hydraulic fluid between the first actuator chamber and one or more of: the hydraulic machine; and the second actuator chamber, and for selectively routing the hydraulic fluid between the second actuator chamber and one or more of: the first actuator chamber; and a low pressure fluid reservoir. The method comprises: determining that a mode change criteria has been met for the hydraulic apparatus; and in response to said determination: controlling the valve arrangement to change the first actuator chamber between being fluidly connected to the hydraulic machine and isolated from the second actuator chamber, and being fluidly connected to both the second actuator chamber and the hydraulic machine. Further in response to the determination, the method comprises controlling a flow rate of hydraulic fluid flowing through the hydraulic machine and flowing through a portion of the hydraulic circuit in fluid communication with the first actuator chamber, to thereby regulate a movement of the at least one hydraulic actuator during the control of the valve arrangement.

Thus, the flow rate of hydraulic fluid flowing through the hydraulic machine and flowing through the portion of the hydraulic circuit in fluid communication with the first actuator chamber can be changed depending on whether the mode of operation of the hydraulic actuator is changed, specifically whether the first actuator chamber is being brought into fluid communication with the second actuator chamber. In this way, the hydraulic apparatus can be reconfigured between normal mode and differential mode during movement of the at least one hydraulic actuator. Of course there may be a very small flow leakage across a baffle between the two actuator chambers, and it will be understood that this is not considered to provide fluid connection between the first actuator chamber and the second actuator chamber within the scope of the invention defined herein.

The hydraulic apparatus may be substantially any system of multiple components, configured to use the at least one hydraulic actuator to perform the hydraulic work function. The hydraulic apparatus may be provided as part of a vehicle, such as a loader, for example a wheel loader. Thus, the present invention extends to the vehicle comprising the hydraulic apparatus.

The hydraulic machine typically defines a plurality of working chambers, each in the hydraulic circuit. Each working chamber may be defined partially by an interior surface of a cylinder, and a movable working surface, mechanically coupled to the rotatable shaft. Typically, the movable working surface is a surface of the piston, in a piston-cylinder pair. A volume of each working chamber may vary cyclically with each rotation of the rotatable shaft. In this way, it will be understood that energy is exchanged between the hydraulic circuit and the prime mover by movement of one or more of the movable working surfaces and the rotatable shaft.

The invention may relate particularly to electronically commutated hydraulic machines which intersperse active cycles of working chamber volume, where there is a net displacement of hydraulic working fluid, with inactive cycles of working chamber volume, where there is no net displacement of hydraulic working fluid between the working chamber and the hydraulic circuit. Typically, the majority or all of the active cycles are full stroke cycles, in which the working chambers displace a predetermined maximum displacement of working fluid by suitable control of the timing of valve actuation signals. It is also known to regulate low- and optionally high-pressure valves of one or more of the plurality of working chambers to regulate the fraction of maximum displacement made during an active cycle by operating so-called part stroke cycles. However, such machines typically intersperse active and inactive cycles, with the active cycles being full stroke cycles, with the fraction of cycles which are active cycles (the active cycle fraction) varied to achieve a demanded fractional displacement, instead of operating with only part stroke cycles.

The controller may be configured (e.g. programmed) to control the low and optionally high-pressure valves of the working chambers to cause each working chamber to carry out either an active or an inactive cycle of working chamber volume during each cycle of working chamber volume.

By 'active cycles' we refer to cycles of working chamber volume which make a net displacement of working fluid. By 'inactive cycles' we refer to cycles of working chamber volume which make no net displacement of working fluid (typically where one or both of the low-pressure valve and high-pressure valve remain closed throughout the cycle). Typically, active and inactive cycles are interspersed to meet the demand indicated by the demand signal. This contrasts with machines which carry out only active cycles, the displacement of which may be varied.

The demand signal for one or more working chambers of the hydraulic machine is typically processed as a 'displacement fraction', Fd, being a target fraction of maximum displacement of working hydraulic fluid per rotation of the rotatable shaft. A demand expressed in volumetric terms (volume of working hydraulic fluid per second) can be converted to displacement fraction taking into account the current speed of rotation of the rotatable shaft and the number of working chambers connected in a group to the same high pressure manifold and one or more hydraulic components (e.g. the at least one hydraulic actuator and one or more further hydraulic components) of the hydraulic apparatus. The demand signal relates to a demand for the combined fluid displacement of the group of one or more working chambers fluidically connected to the said one or more hydraulic components of the hydraulic apparatus via the hydraulic circuit. There may be other groups of one or more working chambers fluidically connected to one or more other hydraulic components having respective demand signals.

It may be that at least the low-pressure valves (optionally the high-pressure valves, optionally both the low-pressure valves and the high-pressure valves) are electronically controlled valves, and the controller or a further controller is configured to control the (e.g. electronically controlled) valves in phased relationship with cycles of working chamber volume to thereby determine the net displacement of hydraulic fluid by each working chamber on each cycle of working chamber volume. The method may comprise controlling the (e.g. electronically controlled) valves in phased relationship with cycles of working chamber volume to thereby determine the net displacement of hydraulic fluid by each working chamber on each cycle of working chamber volume.

Groups of one or more working chambers may be dynamically allocated to respective groups of one or more hydraulic components in the hydraulic circuit (e.g. the hydraulic actuator and/or one or more further hydraulic components) to thereby change which one or more working chambers are connected to (e.g. a group of) hydraulic components, for example by opening or closing electronically controlled valves (e.g. high-pressure valves and low-pressure valves, described herein), e.g. under the control of a controller. Groups of (e.g. one or more) working chambers may be dynamically allocated to (respective) groups of (e.g. one or more) hydraulic components to thereby change which working chambers of the machine are coupled to which hydraulic components, for example by opening and/or closing (e.g. electronically controlled) valves, e.g. under the control of the or a further controller. The net displacement of hydraulic fluid through each working chamber (and/or each hydraulic component) can be regulated by regulating the net displacement of the working chamber or chambers which are connected to the hydraulic component or components. Groups of one or more working chambers are typically connected to a respective group of one or more said hydraulic components through a said manifold.

It may be that the rate of flow of hydraulic fluid accepted by, or output by, each working chamber is independently controllable. It may be that the flow of hydraulic fluid accepted by, or produced by, each working chamber can be independently controlled by selecting the net displacement of hydraulic fluid by each working chamber on each cycle of working chamber volume. This selection is typically carried out by the controller.

Typically, the hydraulic machine is operable as a pump, in a pump operating mode or is operable as a motor in a motor operating mode. It may be that some of the working chambers of the hydraulic machine may pump (and so some working chambers may output hydraulic fluid) while other working chambers of the hydraulic machine may motor (and so some working chambers may input hydraulic fluid).

The hydraulic machine may be a pump-motor. The pump-motor may be a digital displacement pump-motor. Due to the high efficiency of digital displacement pump-motors, the transfer of energy between the hydraulic machine and the at least one hydraulic actuators is also particularly efficient, and more efficient than alternative technologies. It will further be understood that digital displacement pump-motors are particularly suited to this application due to the fast, accurate and independent control of pressure and flow that is possible.

It will be understood that the valve arrangement may comprise substantially any valves in the hydraulic circuit which can affect a fluid flow characteristic of the hydraulic circuit, such as a pressure, a flow rate, or a route of the hydraulic fluid through the hydraulic circuit. Typically, the valve arrangement comprises a plurality of routing valves. It will be understood that controlling at least one of the plurality of routing valves will still be understood to be controlling the valve arrangement.

A difference between a pressure of the low pressure fluid reservoir and atmospheric pressure may be less than a difference between a pressure in the first actuator chamber and atmospheric pressure. The low pressure fluid reservoir may be open to atmosphere.

The volume of hydraulic fluid in the second actuator chamber is fed by a portion of the hydraulic circuit. Fluid is displaced around the hydraulic circuit, and due to its relatively incompressible nature, fluid injected at one side causes immediate fluid ejection, of different fluid at the other side. This fluid displacement effect is termed fluid communication. It reflects a reality where fluid injected causes fluid ejection in another part of the circuit, and this is fluid communication (even though it is not the same actual fluid, i.e. different fluid particles are input compared to those output). The fluid particles injected, cause displacement of upstream particles, and take time to be transported to reach their ejection point from the hydraulic circuit.

The valve arrangement and the hydraulic machine may be controlled as described herein during a lowering movement, or a raising movement, of the hydraulic work function in which the at least one hydraulic actuator is used.

It will be understood that a lowering movement is substantially any movement in which the hydraulic work function is having work done thereto to cause hydraulic fluid to flow from the first actuator chamber towards the hydraulic machine. Similarly, it will be understood that a raising movement is substantially any movement in which the hydraulic work function is doing work caused by flow of hydraulic fluid towards the first actuator chamber from the hydraulic machine.

The at least one hydraulic actuator may be part of a vertical hydraulic work function. In other words, the hydraulic work function may move in a direction having at least a component in a vertical direction.

The two actuator chambers may each be part of the same hydraulic actuator. A movable baffle may be provided between the two actuator chambers. In this way, it will be understood that the first actuator working surface is defined at a first side of the movable baffle, and the second actuator working surface is defined at a second side of the movable baffle, opposite the first side.

In some examples, the at least one hydraulic actuator may be a plurality of hydraulic actuators, such as two hydraulic actuators. Each hydraulic actuator may have two actuator chambers as described hereinbefore.

In this way, it will be understood that the at least one hydraulic actuator defines a first effective working area being the total effective surface area of the first actuator working surface of the or each of the first actuator chamber(s), and defines a second effective working area being the total effective surface area of the second actuator working surface of the or each of the second actuator chamber(s).

Typically, the first effective working area is greater than the second effective working area, ensuring that during movement of the hydraulic actuator, there exists a volume change imbalance between the first actuator chamber(s) and the second actuator chamber(s), to be balanced by fluid flow towards or away from the hydraulic machine. Thus, the at least one hydraulic actuator can be operated in differential mode by bringing the first actuator chamber into fluid communication with the second actuator chamber. The surface area of the first actuator chamber working surface may be greater than a surface area of the second actuator chamber working surface. Typically, a rod of the hydraulic actuator may extend from the second actuator chamber working surface through the second chamber of the at least one hydraulic actuator.

The determination that the mode change criteria has been met for the hydraulic apparatus may be in response to a speed demand for the hydraulic work function crossing a predetermined threshold. Thus, if there is a change in the speed demand, which crosses a predetermined threshold, then the mode change criteria may be met.

In one example, it may be that the demanded speed, when the at least one hydraulic actuator is operating in normal mode, increases from a first level below a first predetermined threshold to a second level above the first predetermined threshold. Typically, the first predetermined threshold is set to be at or below a maximum speed demand which can be satisfied by the hydraulic machine in fluid communication with the first actuator chamber when the at least one hydraulic actuator is operating in normal mode (i.e. where the first actuator chamber is fluidly isolated from the second actuator chamber via the hydraulic circuit). Thus, in order to meet the second speed demand, the hydraulic apparatus is configured to switch the hydraulic actuator from operating in the normal mode to operating in the differential mode.

In another example, it may be that the speed demanded of the hydraulic work function, when the at least one hydraulic actuator is operating in differential mode, decreases from a third speed demand above a second predetermined threshold to a fourth speed demand below the second predetermined threshold. Typically the second predetermined threshold is set to be at or above a maximum speed demand). Thus, the hydraulic apparatus can be configured to switch the hydraulic actuator from the differential to the normal mode (for example to increase the load which can be safely supported by the hydraulic work function).

The second predetermined threshold may be different to the first predetermined threshold. For example, the second predetermined threshold may be greater than the first predetermined threshold. Accordingly, where the speed demand is near one of the first predetermined threshold and the second predetermined threshold, the operating mode of the hydraulic actuator is a form of artificial hysteresis-like behaviour, and is such that it will prevent rapid switching of the valve states, based on only very small variations in the speed demand.

In response to the determination that the mode change criteria has been met, the valve arrangement may be controlled to change the fluid connections of the first actuator chamber from being fluidly connected to the hydraulic machine and fluidly isolated from the second actuator chamber, to another state of the first actuator chamber being fluidly connected to both the second actuator chamber and the hydraulic machine. In this further state, the flow rate of hydraulic fluid flowing through the hydraulic machine and the portion of the hydraulic circuit in fluid communication with the first actuator chamber may be reduced. Thus, the hydraulic apparatus can be controlled to change the operating mode of the at least one hydraulic actuator from normal mode to differential mode.

In response to the determination that the mode change criteria has been met, the valve arrangement may be controlled to change the fluid connections of the first actuator chamber from being fluidly connected to at least one of the plurality of working chambers and the second actuator chamber, to another state of the first actuator chamber being fluidly connected to the at least one of the plurality of working chambers and fluidly isolated from the second actuator chamber. In this further state, the flow rate of hydraulic fluid flowing through the hydraulic machine and the portion of the hydraulic circuit in fluid communication with the first actuator may be increased. Thus, the hydraulic apparatus can be controlled to change the operating mode of the at least one hydraulic actuator from differential mode to normal mode.

In some examples, the hydraulic machine may comprise a plurality of chamber groups. Each chamber group may comprise at least one working chamber. Each chamber group may be controllably routed independently of at least one other of the plurality of chamber groups. In this way, it is possible to fluidly connect one of the plurality of chamber groups to the at least one hydraulic actuator, whilst another of the plurality of chamber groups is fluidly connected to at least one further hydraulic component of the hydraulic apparatus (such as a further hydraulic actuator or an energy storage component, for example a hydraulic accumulator). In some examples, more than one of the chamber groups may be connected to a hydraulic component of the hydraulic apparatus (such as a hydraulic actuator or an energy storage component). The chamber groups are sometimes referred to as pump modules.

The hydraulic apparatus may comprise at least one further hydraulic fluid consumer in the hydraulic circuit. Said consumer may be selectively fluidly connected to the hydraulic machine. The at least one further hydraulic fluid consumer may be used in a further hydraulic work function.

The determination that the mode change criteria has been met for the hydraulic apparatus may be in response to a change in demand for a further hydraulic work function. Where there is an increase in demand for a further hydraulic work function, in response to the determination that the mode change criteria has been met, the hydraulic apparatus may be controlled to isolate at least one of the plurality of chamber groups of the hydraulic machine from the first actuator chamber of the at least one hydraulic actuator. The at least one chamber group is among at least two of the plurality of chamber groups previously together in fluid communication with the first actuator chamber of the at least one hydraulic actuator. In response to the determination that the mode change criteria has been met, the hydraulic apparatus may be further controlled to bring the at least one chamber group of the hydraulic machine into fluid communication with a further hydraulic component to be used to meet a demand of the further hydraulic work function. Thus, the hydraulic machine can be reconfigured to help meet the demand for the further hydraulic work function.

Where there is a decrease in demand from a further hydraulic fluid consumer, in response to the determination that the mode change criteria has been met, the hydraulic apparatus may be controlled to isolate at least one of the chamber groups of the hydraulic machine, previously in fluid communication with a further hydraulic component used to meet a previous demand of the further hydraulic work function, from the further hydraulic component, and to bring the at least one of the plurality of chamber groups into fluid communication with the first actuator chamber of the at least one hydraulic actuator. Thus, the hydraulic machine can be reconfigured to support the movement demand of the at least one hydraulic actuator when the further hydraulic work function has a reduced demand.

The determination that the mode change criteria has been met for the hydraulic apparatus may be in response to a change in a prime mover speed. For prime mover deceleration, the rate of hydraulic fluid displacement will also be decreased. Therefore, it may be necessary to change the at least one hydraulic actuator from operating in the normal mode to operating in the differential mode in order to continue to meet a speed demand for the hydraulic work function without increasing the number of chamber groups of the hydraulic machine being in fluid communication with the at least one hydraulic actuator. Where there is an increase in the prime mover speed, the rate of hydraulic fluid displacement which can be achieved by the at least one of the plurality of working chambers will also be increased. Therefore, it may be possible to change the at least one hydraulic actuator from operating in the differential mode to operating in the normal mode whilst continuing to meet a speed demand for the hydraulic work function without increasing the number of chamber groups of the hydraulic machine being in fluid communication with the at least one hydraulic actuator.

The valve arrangement may comprise an actuator chamber connection valve. The actuator chamber connection valve may be provided in the hydraulic circuit between the two actuator chambers. The actuator chamber connection valve may be a non-proportional valve.

It will be understood that a non-proportional valve typically has only a small number of discrete flow states, which can be selected, including at least an open state where the valve is open, permitting flow of hydraulic fluid therethrough with little if any flow restriction, and a closed state where the valve is closed and does not permit flow of hydraulic fluid therethrough in at least one direction. It may be that the closed state prevents flow of hydraulic fluid in either direction through the valve. The non-proportional valve typically includes fewer than five discrete flow states, such as exactly two flow states. Thus, the state of the valve can be quickly changed between open and closed, which is useful where the mode of the at least one hydraulic actuator is to be changed between normal mode and differential mode, during movement of the at least one hydraulic actuator. In other words, the non-proportional valve may not permit selection of a flow state in a continuum of possible flow states.

The valve arrangement may comprise a low pressure fluid reservoir connection valve, sometimes referred to as a tank valve. The low pressure fluid reservoir may be referred to as a tank, simply as a label, and may in fact not be a literal tank, or it may be a literal tank. The tank valve may be provided in the hydraulic circuit between the second actuator chamber and the tank. The tank valve may be a non-proportional valve. In a first state of the tank valve, it may be configured as a one-way valve, and may be a poppet valve. Specifically, in the first state, the tank valve may be arranged to substantially prevent fluid flow from the second actuator chamber through the tank valve towards the tank, whilst allowing fluid flow from the tank through the tank valve towards the second actuator chamber. In a second state of the tank valve, it may be configured as an open valve, permitting fluid flow therethrough in either direction. The tank valve may comprise fewer than five flow states. The tank valve may comprise exactly two flow states.

The valve arrangement may comprise a controllable orifice. The controllable orifice may be selectively configurable into a restricted flow state in which a restricted quantity of hydraulic fluid is allowed to pass through the controllable orifice. The controllable orifice may further comprise an open flow state in which a greater quantity of hydraulic fluid is allowed to pass than in the restricted flow state. The controllable orifice may be provided in the hydraulic circuit between the second actuator chamber and the low pressure fluid reservoir. The controllable orifice may be the same as the tank valve.

There may be a time offset between the change of 1) the valve arrangement and 2) the change in the flow rate of the hydraulic fluid flowing through the hydraulic machine and the portion of the hydraulic circuit in fluid communication with the first actuator chamber. In other words, a valve control signal to cause a change in state of one or more valves of the valve arrangement may be provided at a time different to a flow rate control signal to cause a change in flow rate of the hydraulic fluid flowing through the hydraulic machine. Thus, where the response speeds and operating times of the valves of the valve arrangement are different to those of the valves of the hydraulic machine, the valve control signal can still maintain smooth motion of the hydraulic work function in accordance with a system demand. The smooth motion of the hydraulic work function is done by starting to change the state of the valve(s) at a different time to changing the flow rate of the hydraulic fluid through the hydraulic machine.

It will be appreciated that in some examples, the change of state of the valve arrangement may begin before the change in the displacement value, or it may begin after.

The time offset may be less than 0.5 seconds. The time offset may be less than 200 milliseconds. The time offset may be greater than 10 milliseconds.

To control the hydraulic machine to change the displacement value in response to the determination, the hydraulic machine may be controlled to implement an intermediate flow rate of the hydraulic fluid flowing through the hydraulic machine and to subsequently implement a further flow rate of the hydraulic fluid flowing through the hydraulic machine. Thus, the hydraulic machine may not be controlled to switch immediately between an initial flow rate and a further flow rate, but may in some examples switch to an intermediate flow rate. As a result, the movement of the hydraulic work function may be regulated more smoothly, by taking account of a temporary significant pressure differential between the first actuator chamber and the second actuator chamber.

The intermediate flow rate may be outside a range defined by the initial flow rate and the further flow rate. The further flow rate may be between the initial flow rate and the intermediate flow rate. Accordingly, when the at least one hydraulic actuator is switched from normal mode to differential mode, the intermediate flow rate of the hydraulic machine can be used to quickly fill the portion of the hydraulic circuit including the second actuator chamber with hydraulic fluid having a pressure similar to the hydraulic fluid already in the portion of the hydraulic circuit including the first actuator chamber, to thereby regulate the movement of the hydraulic work function.

In some examples, the intermediate flow rate may be 0. The intermediate flow rate may be such as to cause the hydraulic machine to operate in the opposite sense. In other words, if the hydraulic machine were previously motoring, the intermediate flow rate may be such as to cause the hydraulic machine to be pumping, at least temporarily.

The intermediate flow rate may be in an opposite sense to the further flow rate, such that the hydraulic machine pumps hydraulic fluid towards the second actuator chamber to cause pressurisation of the second actuator chamber.

It may be that the controller is configured to cause the hydraulic machine to operate the hydraulic machine in accordance with the further flow rate in response to determining that a hydraulic pressure in the second actuator chamber meets (e.g. exceeds) a pressure threshold.

The change in the flow rate of the hydraulic fluid flowing through the hydraulic machine may be implemented depending on a predetermined rate limit of the change of the flow rate. Thus, the flow rate of the hydraulic fluid flowing through the hydraulic machine may be controlled to change no more quickly than as permitted by the predetermined rate limit. The predetermined rate limit may be stored in memory. The predetermined rate limit may be less than a maximum rate of change of the flow rate physically possible by the hydraulic machine. Thus, the rate of change may be controlled to maintain smooth movement of the hydraulic work function during the change in operating mode of the at least one hydraulic actuator between normal mode and differential mode.

It will be understood that a hydraulic actuator is substantially any hydraulic component for exchanging energy between pressurised hydraulic fluid and kinetic movement. In other words, the hydraulic actuator may extract energy from pressurised hydraulic fluid by causing movement of a movable component by force exerted on the movable component by the pressurised hydraulic fluid. The hydraulic actuator may additionally or alternatively extract energy from movement of a movable component by causing pressurisation of hydraulic fluid by force exerted by the movable component.

The kinetic movement may be linear, or may be rotary. In some examples, the hydraulic actuator may be a hydraulic propulsion motor.

Viewed from another aspect, there is provided a hydraulic apparatus as described hereinbefore, and comprising the controller also as described hereinbefore.

Where not explicitly mentioned, it will be understood that the method described herein may also include any of the steps performed by the controller as elsewhere described herein.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
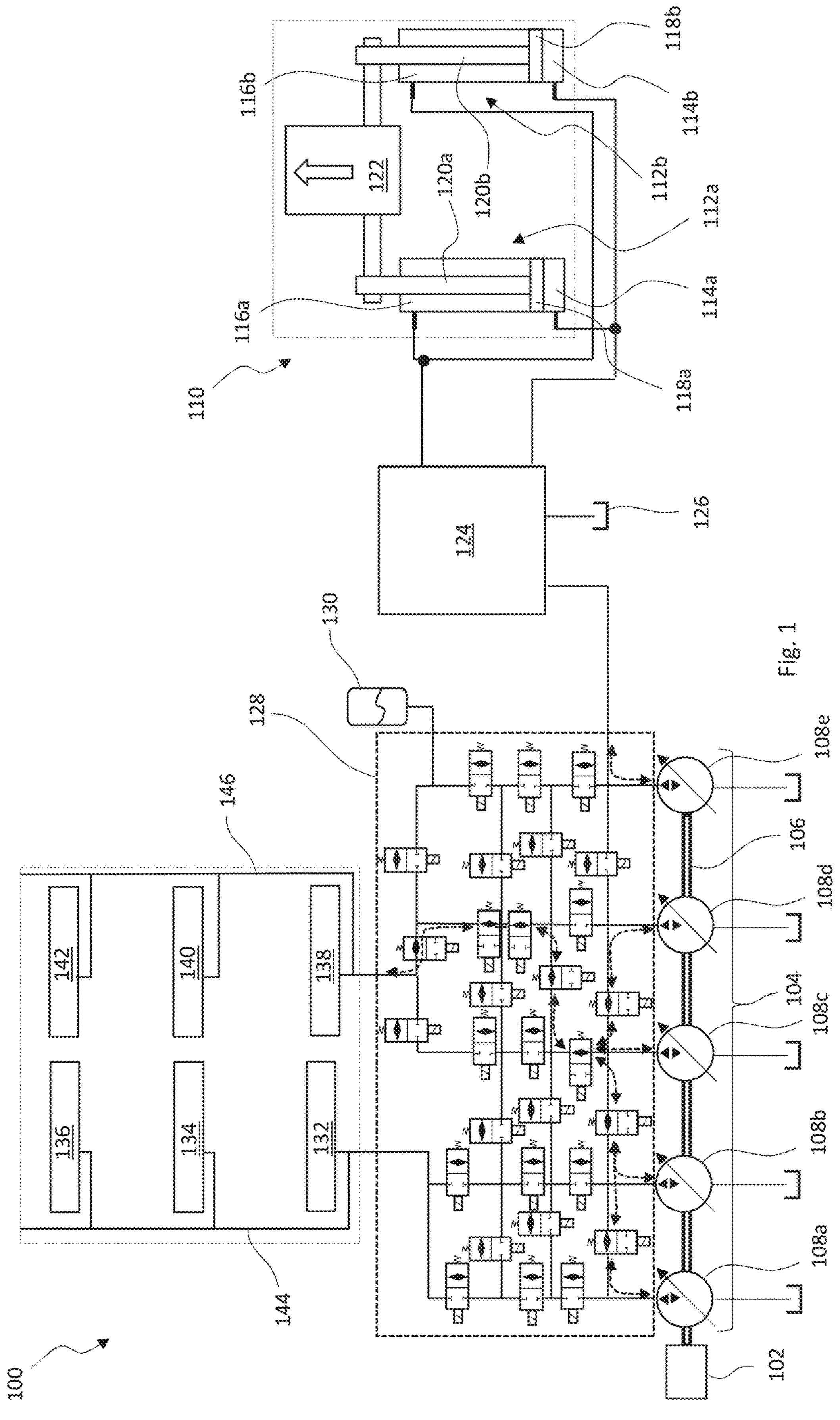
FIG. 1 is a schematic illustration of an example of hydraulic apparatus as described herein.

FIG. 1 is a schematic illustration of an example of hydraulic apparatus as described herein. The hydraulic apparatus 100 comprises a prime mover 102 and a hydraulic machine 104. The hydraulic machine 104 has a rotatable shaft 106 in driven engagement with the prime mover 102. In this example, the hydraulic machine 104 defines a plurality of groups of working chambers, specifically five groups of working chambers, sometimes referred to as chamber groups 108*a*, 108*b*, 108*c*, 108*d*, 108*e*. The detailed operation of the hydraulic machine 104, and in particular the groups of working chambers 108*a*, 108*b*, 108*c*, 108*d*, 108*e* will be explained further with reference to FIG. 5 hereinafter. Although not shown in FIG. 1, it will be understood that each group of working chambers 108*a*, 108*b*, 108*c*, 108*d*, 108*e* typically comprises a plurality of working chambers in a hydraulic circuit, each working chamber being defined partially by a movable working surface mechanically coupled to the rotatable shaft 106 such that, in operation, the hydraulic machine 104 exchanges energy with the hydraulic circuit and the prime mover 102 by movement of the working surfaces and the rotatable shaft 106.

It will be understood that the hydraulic circuit is defined by any portions of the hydraulic apparatus 100 through which hydraulic fluid can flow and which are in or can be brought into fluid communication with any of the working chambers of the hydraulic machine 104.

The hydraulic apparatus 100 comprises a first hydraulic work function, in this example a boom lifting work function 110. The boom lifting work function 110 uses a first hydraulic actuator 112*a* and a second hydraulic actuator 112*b*, each in the form of a cylinder ram, mounted between two mutually movable components of a boom of the vehicle to be moved by operation of the boom lifting work function. The first hydraulic actuator 112*a* comprises a first actuator chamber 114*a* and a second actuator chamber 116*a*. Similarly, the second hydraulic actuator 112*b* also comprises a first actuator chamber 114*b* and a second actuator chamber 116*b*. Each of the actuator chambers 114*a*, 114*b*, 116*a*, 116*b* are in the hydraulic circuit. The first hydraulic actuator 112*a* further comprises a piston 118*a* having a rod 120*a* extending therefrom through the second actuator chamber 116*a* of the first hydraulic actuator 112*a*. Similarly, the second hydraulic actuator 112*b* also comprises a piston 118*b* having a rod 120*b* extending therefrom through the second actuator chamber 116*b* of the second hydraulic actuator 112*b*. The rod 120*a* of the first hydraulic actuator 112*a* is mechanically connected to the rod 120*b* of the second hydraulic actuator 112*b* and to the boom 122, such that movement of one of the hydraulic actuators 112*a*, 112*b* and the boom 122 causes movement of the other of the hydraulic actuators 112*a*, 112*b* and the boom 122.

An actuator valve arrangement 124 is provided in the hydraulic circuit between the first and second hydraulic actuators 112*a*, 112*b* and the hydraulic machine 104, and further in fluid communication with a low pressure fluid reservoir 126. Although not shown in FIG. 1, the actuator valve arrangement 124 typically comprises a plurality of valves, each for restricting flow of fluid in at least one direction therethrough. At least one of the plurality of valves is selectively controllable to change between at least two operating states. The actuator valve arrangement 124 is in fluid communication with both of the first actuator chambers 114*a*, 114*b* of the first and second hydraulic actuators 112*a*, 112*b*, and separately in fluid communication with both of the second actuator chambers 116*a*, 116*b* of the first and second hydraulic actuators 112*a*, 112*b*. The actuator valve arrangement 124 can be controlled to selectively route hydraulic fluid via part of the hydraulic circuit between the first actuator chambers 114*a*, 114*b* (located at the bottom of each of the cylinder rams) and one or more of: the hydraulic machine 104; and the second actuator chambers 116*a*, 116*b* (located at the top of each of the cylinder rams), and controlled to selectively route hydraulic fluid via the hydraulic circuit between the second actuator chambers 116*a*, 116*b* and one or more of: the first actuator chambers 114*a*, 114*b*; and the low pressure fluid reservoir 126. In other words, the actuator valve arrangement 124 is configured to, in a first configuration, bring the first actuator chambers 114*a*, 114*b* into fluid communication with the hydraulic machine 104, and isolate the first actuator chambers 114*a*, 114*b* from the second actuator chambers 116*a*, 116*b*, instead bringing the second actuator chambers 116*a*, 116*b* into fluid communication with the low pressure fluid reservoir 126. The actuator valve arrangement 124 is further configured to, in a second configuration, bring the first actuator chambers 114*a*, 114*b* (located at the bottom of the cylinder ram) into fluid communication with the hydraulic machine 104 and with the second actuator chambers 116*a*, 116*b*, and isolate the low pressure fluid reservoir 126 from the second actuator chambers 116*a*, 116*b*. An example configuration of the actuator valve arrangement 124 and its operation is shown and described in more detail with reference to FIG. 2 hereinafter.

The hydraulic apparatus 100 further comprises a hydraulic machine valve arrangement 128 in the form of a ganging arrangement 128. The ganging arrangement 128 comprises a plurality of valves for selectively bringing the working chambers of the hydraulic machine 104 into fluid communication with other components of the hydraulic apparatus 100 via the hydraulic circuit.

The other components comprise an energy storage component 130 in the form of a hydraulic accumulator 130 and one or more further hydraulic services, in this example six further hydraulic services 132, 134, 136, 138, 140, 142. Three of the six further hydraulic services 132, 134, 136 are controllably fluidly connected to the ganging arrangement 128 via a first conduit 144. A further three of the six further hydraulic services 138, 140, 142 are controllably fluidly connected to the ganging arrangement 128 via a second conduit 146, separate to the first conduit 144. It will be understood that a further valve (not shown in FIG. 1) may be fluidly connected between the ganging arrangement 128 and each of the further hydraulic services 132, 134, 136, 138, 140, 142. Each of the further hydraulic services may also be selectively connected to other hydraulic circuit components, such as the low-pressure fluid reservoir 126, though these connections are omitted for simplicity.

FIG. 1 also includes double-headed broken-line arrows, showing the routing of hydraulic fluid based on the illustrated settings of the valves shown in the ganging arrangement 128.

The hydraulic apparatus 100 further comprises a controller (not shown in FIG. 1) configured to control at least the hydraulic machine 104, the actuator valve arrangement 124, and the ganging arrangement 128 of the hydraulic apparatus 100. The operation of the controller will be explained further with reference to FIG. 4 hereinafter. It will be understood that in some examples, the hydraulic apparatus can be connected to a separate controller for controlling one or more components of the hydraulic apparatus, but can still nevertheless be considered to be hydraulic apparatus.

Figure 2:
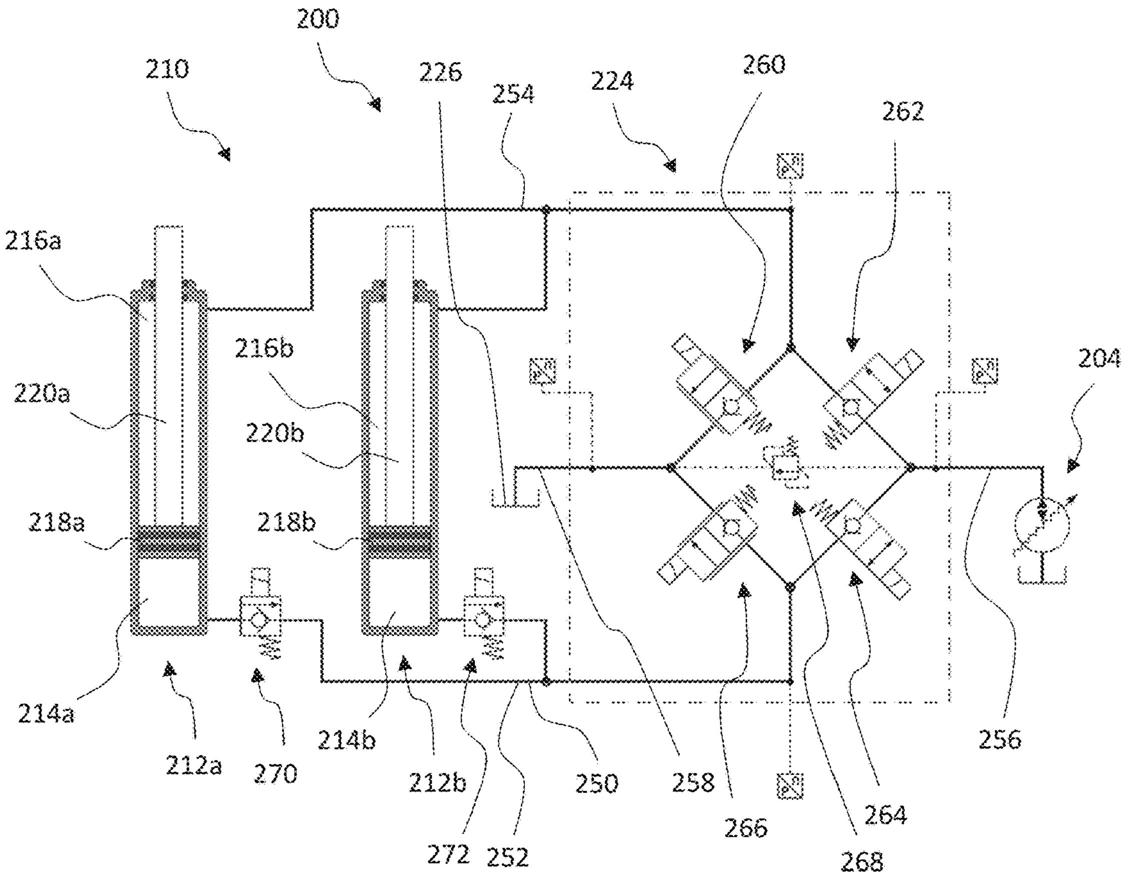
FIG. 2 is a schematic illustration of a portion of hydraulic apparatus as described herein.

FIG. 2 is a schematic illustration of a portion of hydraulic apparatus as described herein. Specifically, the portion 200 of the hydraulic apparatus comprises a first hydraulic actuator 212*a* and a second hydraulic actuator 212*b* each in the form of a cylinder ram, together being used in a hydraulic work function 210. The first hydraulic actuator 212*a* comprises a first actuator chamber 214*a* and a second actuator chamber 216*a*. Similarly, the second hydraulic actuator 212*b* also comprises a first actuator chamber 214*b* and a second actuator chamber 216*b*. Each of the actuator chambers 214*a*, 214*b*, 216*a*, 216*b* are in a hydraulic circuit 250. The first hydraulic actuator 212*a* further comprises a piston 218*a* having a rod 220*a* extending therefrom through the second actuator chamber 216*a* of the first hydraulic actuator 212*a*. Similarly, the second hydraulic actuator 212*b* also comprises a piston 218*b* having a rod 220*b* extending therefrom through the second actuator chamber 216*b* of the second hydraulic actuator 212*b*. Although not shown in FIG. 2, typically, the rod 220*a* of the first hydraulic actuator 212*a* is mechanically connected to the rod 220*b* of the second hydraulic actuator 212*b*, such that the pistons move together.

An actuator valve arrangement 224, in the form of an H-bridge 224, is provided in the hydraulic circuit 250 between the first and second hydraulic actuators 212*a*, 212*b* and a hydraulic machine 204, and further in fluid communication with a low pressure fluid reservoir 226.

The actuator valve arrangement 224 comprises a plurality of valves, controllable to cause the hydraulic apparatus to function as described herein. The hydraulic circuit 250 is formed of a plurality of conduits. The plurality of conduits comprises a first chamber conduit 252, connecting both of the first actuator chambers 214*a*, 214*b* with the actuator valve arrangement 224. The plurality of conduits further comprises a second chamber conduit 254, connecting both of the second actuator chamber 216*a*, 216*b* with the actuator valve arrangement 224. The plurality of conduits further comprises a hydraulic machine conduit 256, connecting the hydraulic machine 204 to the actuator valve arrangement 224, and a low-pressure reservoir conduit 258, connecting the low-pressure fluid reservoir 226 to the actuator valve arrangement 224. The actuator valve arrangement 224 comprises a first valve 260, a second valve 262, a third valve 264 and a fourth valve 266.

The first valve 260 controls flow between the second chamber conduit 254 and the low-pressure reservoir conduit 258. In the first position, the first valve 260 is configured to permit flow of hydraulic fluid only from the low-pressure reservoir conduit 258 towards the second chamber conduit 254, whilst substantially preventing flow of hydraulic fluid from the second chamber conduit 254 towards the low-pressure reservoir conduit 258. In the second position, the first valve 260 is configured to permit flow of hydraulic fluid from the second chamber conduit 254 towards the low-pressure reservoir conduit 258. The first valve 260 can be controlled proportionally to implement a plurality of different fluid flow rates in the second position.

The second valve 262 controls flow between the second chamber conduit 254 and the hydraulic machine conduit 256. In the first position, the second valve 262 is configured to permit flow of hydraulic fluid only from the second chamber conduit 254 towards the hydraulic machine conduit 256, whilst substantially preventing flow of hydraulic fluid from the hydraulic machine conduit 256 towards the second chamber conduit 254. In the second position, the second valve 262 is configured to permit flow of hydraulic fluid in either direction between the hydraulic machine conduit 256 and the second chamber conduit 254. The second valve 262 is solenoid-operated.

The third valve 264 controls flow between the first chamber conduit 252 and the hydraulic machine conduit 256. In the first position, the third valve 264 is configured to permit flow of hydraulic fluid only from the first chamber conduit 252 towards the hydraulic machine conduit 256, whilst substantially preventing flow of hydraulic fluid from the hydraulic machine conduit 256 towards the first chamber conduit 252. In the second position, the third valve 264 is configured to permit flow of hydraulic fluid in either direction between the hydraulic machine conduit 256 and the first chamber conduit 252. The third valve 264 is solenoid-operated.

The fourth valve 266 controls flow between the first chamber conduit 252 and the low-pressure reservoir conduit 258. In the first position, the fourth valve 266 is configured to permit flow of hydraulic fluid only from the low-pressure reservoir conduit 258 towards the first chamber conduit 252, whilst substantially preventing flow of hydraulic fluid from the first chamber conduit 252 towards the low-pressure reservoir conduit 258. In the second position, the fourth valve 266 is configured to permit flow of hydraulic fluid in either direction between the low-pressure reservoir conduit 258 and the first chamber conduit 252. The fourth valve 266 can be controlled proportionally to implement a plurality of different fluid flow rates in the second position.

Each of the first, second, third, and fourth valves (260, 262, 264, 266) is an electronically controllable valve movable between a first position (as shown in FIG. 2) and a second position.

The actuator valve arrangement 224 further includes a safety valve 268 allowing the hydraulic machine conduit 256 to be connected directly to the low-pressure reservoir conduit 258 in the event of a dangerous pressure build-up in the hydraulic machine conduit 256.

The apparatus is further provided with a first actuator safety valve 270 and a second actuator safety valve 272, which each operate to prevent uncontrolled lowering of the first actuator 212*a* and the second actuator 212*b* respectively should there be a failure of the electronic control system of the apparatus.

Figure 3:
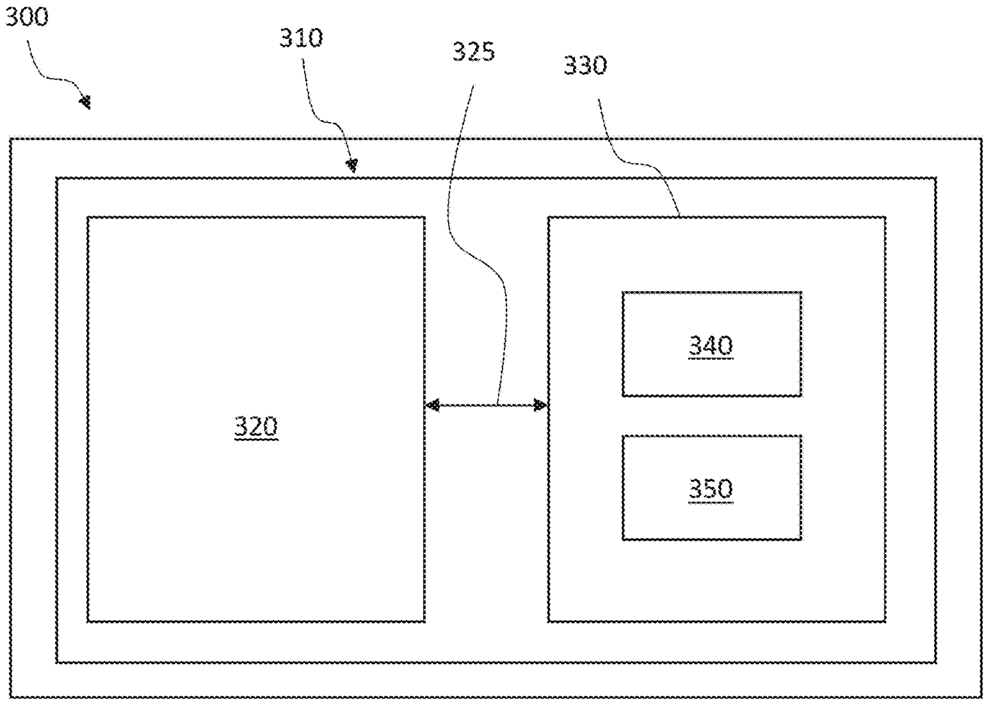
FIG. 3 is a schematic illustration of systems of a vehicle according to an example of the present disclosure.

FIG. 3 is a schematic illustration of systems of a vehicle according to an example of the present disclosure. The vehicle 300 comprises hydraulic apparatus 310 as described herein, including a hydraulic machine 320, and a controller 330. The controller 330 is configured to exchange signals 325 with the hydraulic machine 320 to control the hydraulic apparatus 310 in accordance with input signals received by the controller 330, for example from user inputs by an operator of the vehicle 300. The controller 330 in this example is realised by one or more processors 340 and a computer-readable memory 350. The memory 350 stores instructions which, when executed by the one or more processors 340, cause the hydraulic apparatus 310 to operate as described herein.

Although the controller 330 is shown as being part of the vehicle 300, it will be understood that one or more components of the controller 330, or even the whole controller 330 can be provided separate from the vehicle 300, for example remotely from the vehicle 300, to exchange signals with the vehicle 300 by wireless communication.

Figure 4:
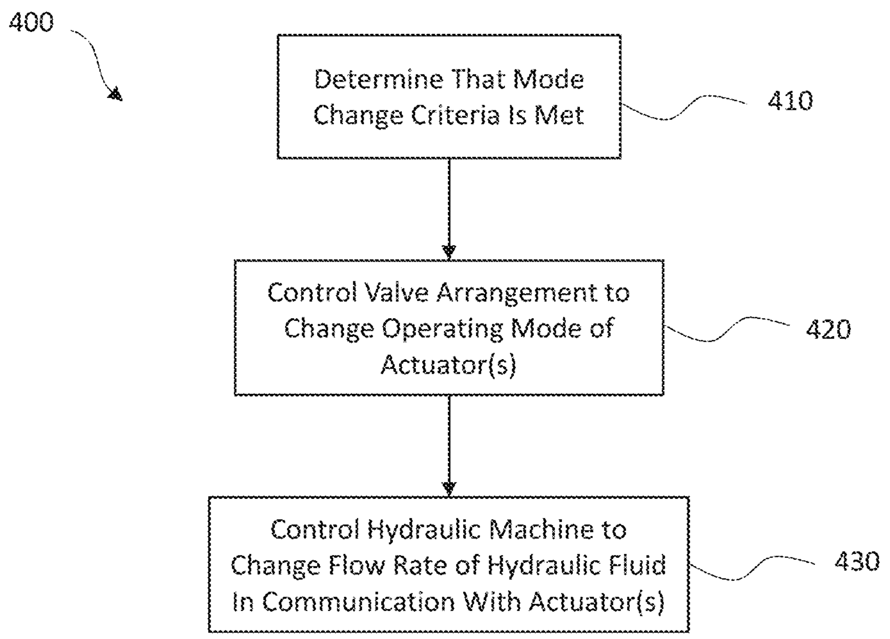
FIG. 4 is a flowchart illustrating a method of controlling a hydraulic machine as described herein.

FIG. 4 is a flowchart illustrating a method of controlling a hydraulic machine as described herein. The method 400 is a method of controlling hydraulic apparatus, including a hydraulic machine, during transition of at least one hydraulic actuator, between a normal mode of operation and a differential mode of operation. Specifically, the method 400 comprises determining 410 that a mode change criteria has been met for the hydraulic apparatus. In other words, the method comprises determining, based on one or more parameters, that the operating mode of the at least one hydraulic actuator should be transitioned from the current operating mode, to a different operating mode (i.e. from normal mode to differential mode or vice versa). As described hereinbefore, the determination that the operating mode of the at least one hydraulic actuator should be changed may depend on one or more of 1) the requested speed of the hydraulic actuator, 2) operating demands in place for further hydraulic work functions connected to the hydraulic machine, and 3) a change in the shaft speed of the prime mover.

The method 400 further comprises, in response to the determination, controlling 420 the valve arrangement to change the operating mode of the at least one hydraulic actuator between modes. Specifically, to operate the at least one hydraulic actuator in normal mode, the first chamber of the hydraulic actuator is fluidly isolated from the second chamber of the hydraulic actuator, and fluidly connected with the hydraulic machine. Typically the second chamber is fluidly connected with a low-pressure fluid reservoir. To operate the at least one hydraulic actuator in differential mode, the first chamber of the hydraulic actuator is fluidly connected to both the second chamber of the hydraulic actuator and the hydraulic machine, at the same time.

Also in response to the determination, the method 400 further comprises controlling 430 the hydraulic machine to change a flow-rate of hydraulic fluid (e.g. a displacement fraction of a hydraulic machine) flowing through the hydraulic machine and the portion of the hydraulic circuit in fluid communication with the at least one hydraulic actuator. As described hereinbefore, where the operating mode of the actuator is changed from normal to differential or from differential to normal, during movement of the hydraulic actuator, the proportion of hydraulic fluid being exchanged between the first chamber of the hydraulic actuator and the hydraulic machine will change significantly in a very short space of time. Therefore, the flow-rate of the hydraulic fluid through the hydraulic machine also needs to change to ensure smooth movement of the hydraulic actuator during the transition. Specifically, the flow-rate needs to be reduced during a transition from normal operating mode of the hydraulic actuator to differential operating mode of the hydraulic actuator. Conversely, the flow-rate needs to be increased during a transition from differential operating mode of the hydraulic actuator to normal operating mode of the hydraulic actuator.

Figure 5:
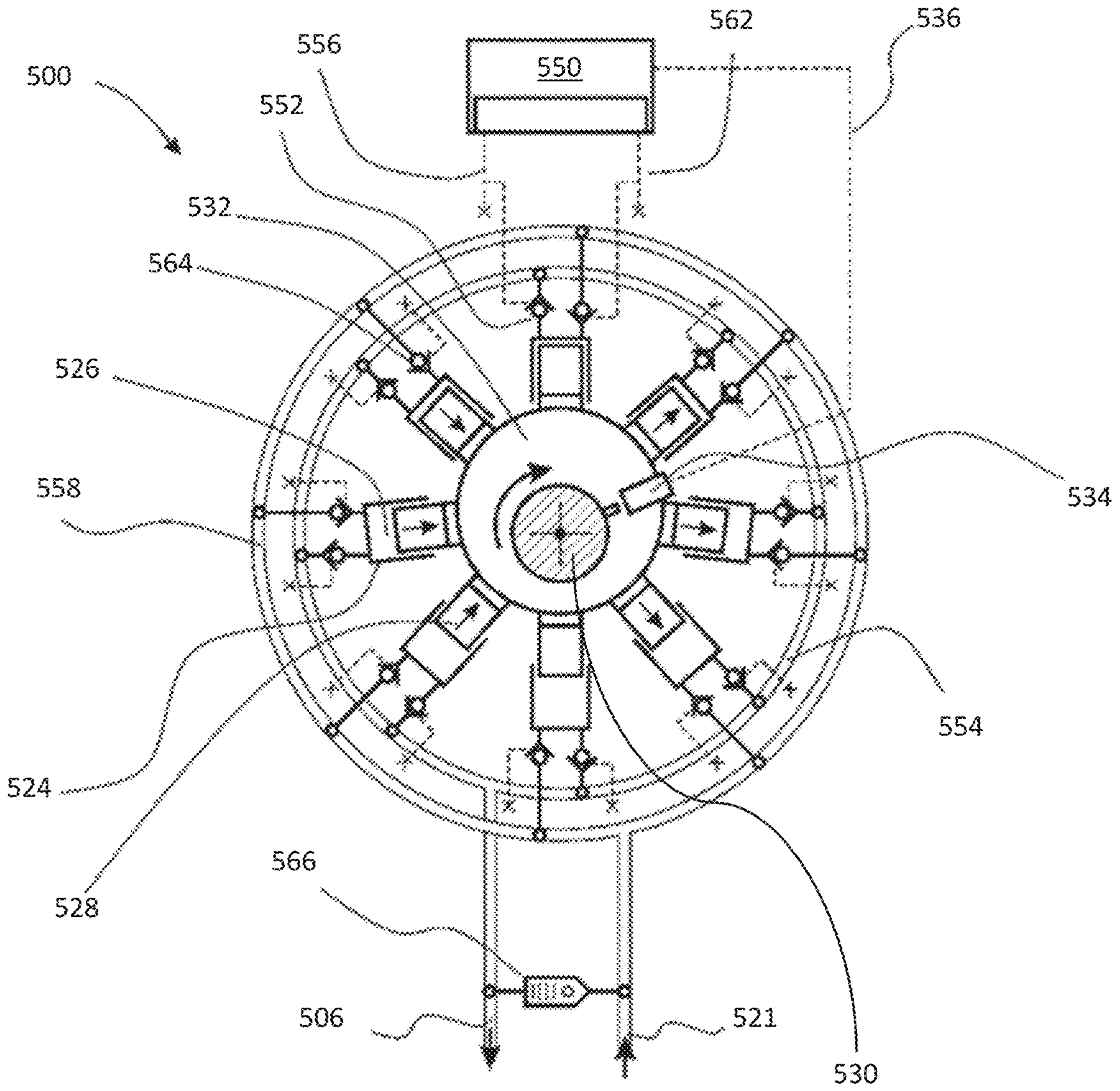
FIG. 5 is a schematic diagram of an example of a hydraulic machine.

FIG. 5 is a schematic diagram of part of the hydraulic apparatus shown in FIGS. 1 and 2, and shows a single group of working chambers currently connected to one or more hydraulic components (e.g. an actuator) through a high pressure manifold 554. FIG. 5 provides detail on the first group 500, said group comprises a plurality of working chambers (8 are shown) having cylinders 524 which have working volumes 526 defined by the interior surfaces of the cylinders and pistons 528 (providing working surfaces 528) which are driven from a rotatable shaft 530 by an eccentric cam 532 and which reciprocate within the cylinders to cyclically vary the working volume of the cylinders. The rotatable shaft is firmly connected to and rotates with a drive shaft. A shaft position and speed sensor 534 sends electrical signals through a signal line 536 to a controller 550, which thus enables the controller to determine the instantaneous angular position and speed of rotation of the shaft, and to determine the instantaneous phase of the cycles of each cylinder.

The working chambers are each associated with Low Pressure Valves (LPVs) in the form of electronically actuated face-sealing poppet valves 552, which have an associated working chamber and are operable to selectively seal off a channel extending from the working chamber to a low-pressure hydraulic fluid manifold 554, which may connect one or several working chambers, or indeed all as is shown here, to the low-pressure hydraulic fluid manifold hydraulic circuit. The LPVs are normally open solenoid actuated valves which open passively when the pressure within the working chamber is less than or equal to the pressure within the low-pressure hydraulic fluid manifold, i.e. during an intake stroke, to bring the working chamber into fluid communication with the low-pressure hydraulic fluid manifold but are selectively closable under the active control of the controller via LPV control lines 556 to bring the working chamber out of fluid communication with the low-pressure hydraulic fluid manifold. The valves may alternatively be normally closed valves. As well as force arising from the pressure difference across the valve, flow forces from the passage of fluid across the valve, also influence the net force on the moving valve member.

The working chambers are each further associated with a respective High-Pressure Valve (HPV) 564 each in the form of a pressure actuated delivery valve. The HPVs open outwards from their respective working chambers and are each operable to seal off a respective channel extending from the working chamber through a valve block to a high-pressure hydraulic fluid manifold 558, which may connect one or several working chambers, or indeed all as is shown in FIG. 5. The HPVs function as normally-closed pressure-opening check valves which open passively when the pressure within the working chamber exceeds the pressure within the high-pressure hydraulic fluid manifold. The HPVs also function as normally-closed solenoid actuated check valves which the controller may selectively hold open via HPV control lines 562 once that HPV is opened by pressure within the associated working chamber. Typically, the HPV is not openable by the controller against pressure in the high-pressure hydraulic fluid manifold. The HPV may additionally be openable under the control of the controller when there is pressure in the high-pressure hydraulic fluid manifold but not in the working chamber, or may be partially openable.

In a pumping mode, the controller selects the net rate of displacement of hydraulic fluid from the working chamber to the high-pressure hydraulic fluid manifold by the hydraulic motor by actively closing one or more of the LPVs typically near the point of maximum volume in the associated working chamber's cycle, closing the path to the low-pressure hydraulic fluid manifold and thereby directing hydraulic fluid out through the associated HPV on the subsequent contraction stroke (but does not actively hold open the HPV). The controller selects the number and sequence of LPV closures and HPV openings to produce a flow or create a shaft torque or power to satisfy a selected net rate of displacement.

In a motoring mode of operation, the controller selects the net rate of displacement of hydraulic fluid, displaced via the high-pressure hydraulic fluid manifold, actively closing one or more of the LPVs shortly before the point of minimum volume in the associated working chamber's cycle, closing the path to the low-pressure hydraulic fluid manifold which causes the hydraulic fluid in the working chamber to be compressed by the remainder of the contraction stroke. The associated HPV opens when the pressure across it equalises and a small amount of hydraulic fluid is directed out through the associated HPV, which is held open by the controller. The controller then actively holds open the associated HPV, typically until near the maximum volume in the associated working chamber's cycle, admitting hydraulic fluid from the high-pressure hydraulic fluid manifold to the working chamber and applying a torque to the rotatable shaft.

As well as determining whether or not to close or hold open the LPVs on a cycle by cycle basis, the controller is operable to vary the precise phasing of the closure of the HPVs with respect to the varying working chamber volume and thereby to select the net rate of displacement of hydraulic fluid from the high-pressure to the low-pressure hydraulic fluid manifold or vice versa.

Arrows on the low pressure fluid connection 506, and the high-pressure fluid connection 521 indicate hydraulic fluid flow in the motoring mode; in the pumping mode the flow is reversed. A pressure relief valve 566 may protect the first group from damage.

In normal operation, the active and inactive cycles of working chamber volume are interspersed to meet the demand indicated by the hydraulic machine control signal.

Throughout the description and claims of this specification, the words "comprise" and "contain" and variations of them mean "including but not limited to", and they are not intended to and do not exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A controller for a hydraulic apparatus, the hydraulic apparatus comprising:

a prime mover;

a hydraulic circuit through which hydraulic fluid can flow;

a hydraulic machine in the hydraulic circuit and having a rotatable shaft in driven engagement with the prime mover, the hydraulic machine configured such that, in operation, the hydraulic machine exchanges energy with the hydraulic circuit and the prime mover by flow of hydraulic fluid between the hydraulic machine and the hydraulic circuit and via movement of the rotatable shaft, wherein the hydraulic machine comprises a plurality of chamber groups, each comprising at least one working chamber in the hydraulic circuit;

at least one hydraulic actuator having at least a first actuator chamber and a second actuator chamber, each actuator chamber in the hydraulic circuit, the at least one hydraulic actuator to be used in a hydraulic work function of the hydraulic apparatus, wherein the first actuator chamber is partially defined by a first actuator working surface and the second actuator chamber is partially defined by a second actuator working surface, the second actuator working surface arranged to act at least partially in opposition to the first actuator working surface;

at least one further hydraulic fluid consumer in the hydraulic circuit and selectively fluidly connected to the hydraulic machine, wherein the at least one further hydraulic fluid consumer is to be used in a further hydraulic work function; and a valve arrangement in the hydraulic circuit for selectively routing the hydraulic fluid between the first actuator chamber and one or more of: the hydraulic machine;

and the second actuator chamber, and for selectively routing the hydraulic fluid between the second actuator chamber and one or more of: the first actuator chamber; and a low pressure fluid reservoir, the controller configured to:

determine that a mode change criteria has been met for the hydraulic apparatus in response to an increase in demand for the further hydraulic work function; and in response to the determination:

control the valve arrangement to change the first actuator chamber between being fluidly connected to the hydraulic machine and fluidly isolated from the second actuator chamber, and being fluidly connected to both the second actuator chamber and the hydraulic machine; and control the hydraulic machine to change a flow rate of hydraulic fluid flowing through the hydraulic machine and a portion of the hydraulic circuit in fluid communication with the first actuator chamber, to thereby regulate a movement of the at least one hydraulic actuator during the control of the valve arrangement, wherein controlling the valve arrangement to change the first actuator chamber between being fluidly connected to the hydraulic machine and fluidly isolated from the second actuator chamber, and being fluidly connected to both the second actuator chamber and the hydraulic machine comprises controlling the hydraulic apparatus to isolate at least one chamber group of the hydraulic machine from the first actuator chamber of the at least one hydraulic actuator, the at least one chamber group among at least two of the plurality of chamber groups previously together in fluid communication with the first actuator chamber of the at least one hydraulic actuator.

2. The controller of claim 1, wherein the valve arrangement and the hydraulic machine are controlled during a lowering movement of the hydraulic work function in which the at least one hydraulic actuator is used, or wherein the valve arrangement and the hydraulic machine are controlled during a raising movement of the hydraulic work function in which the at least one hydraulic actuator is used.

3. The controller of claim 1, wherein a surface area of the first actuator working surface is greater than a surface area of the second actuator working surface.

4. The controller of claim 1, wherein the increase in demand for the further hydraulic work function is based on a speed demand for the hydraulic work function crossing a predetermined threshold.

5. The controller of claim 1, wherein, controlling the valve arrangement to change the first actuator chamber between being fluidly connected to the hydraulic machine and fluidly isolated from the second actuator chamber, and being fluidly connected to both the second actuator chamber and the hydraulic machine is controlling the valve arrangement to change the first actuator chamber from being fluidly connected to the hydraulic machine and fluidly isolated from the second actuator chamber, to being fluidly connected to both the second actuator chamber and the hydraulic machine, and wherein controlling the hydraulic machine to change a flow rate of hydraulic fluid flowing through the hydraulic machine and a portion of the hydraulic circuit in fluid communication with the first actuator chamber is controlling the hydraulic machine to reduce a flow rate of hydraulic fluid flowing through the hydraulic machine and the portion of the hydraulic circuit in fluid communication with the first actuator chamber.

6. The controller of claim 1, wherein, controlling the valve arrangement to change the first actuator chamber between being fluidly connected to the hydraulic machine and fluidly isolated from the second actuator chamber, and being fluidly connected to both the second actuator chamber and the hydraulic machine is controlling the valve arrangement to change the first actuator chamber from being fluidly connected to both the second actuator chamber and the hydraulic machine, to being fluidly connected to the hydraulic machine and fluidly isolated from the second actuator chamber and wherein controlling the hydraulic machine to change a flow rate of hydraulic fluid flowing through the hydraulic machine and a portion of the hydraulic circuit in fluid communication with the first actuator chamber is controlling the hydraulic machine to increase a flow rate of hydraulic fluid flowing through the hydraulic machine and the portion of the hydraulic circuit in fluid communication with the first actuator chamber.

7. The controller of claim 1, wherein the valve arrangement comprises an actuator chamber connection valve, provided in the hydraulic circuit between the first actuator chamber and the second actuator chamber, and being a non-proportional valve.

8. The controller of claim 1, wherein the hydraulic machine is an electronically commutated hydraulic machine.

9. The controller of claim 1, wherein there is a time offset between the change of the valve arrangement and the change in the flow rate of the hydraulic fluid flowing through the hydraulic machine and the portion of the hydraulic circuit in fluid communication with the first actuator chamber.

10. The controller of claim 1, wherein, to control the hydraulic machine to change the flow rate in response to the determination, the hydraulic machine is controlled to implement an intermediate flow rate of the hydraulic fluid flowing through the hydraulic machine and to subsequently implement a further flow rate of the hydraulic fluid flowing through the hydraulic machine.

11. The controller of claim 10, wherein the intermediate flow rate is in an opposite sense to the further flow rate, such that the hydraulic machine pumps hydraulic fluid towards the second actuator chamber to cause pressurisation of the second actuator chamber.

12. The controller of claim 1, wherein the change in the flow rate of the hydraulic fluid flowing through the hydraulic machine is implemented depending on a predetermined rate limit of a change of a displacement value.

13. A method of controlling a hydraulic apparatus comprising:

determining that a mode change criteria has been met for the hydraulic apparatus, wherein the hydraulic apparatus comprises:

a prime mover;

a hydraulic circuit through which hydraulic fluid can flow;

a hydraulic machine in the hydraulic circuit and having a rotatable shaft in driven engagement with the prime mover, the hydraulic machine configured such that, in operation, the hydraulic machine exchanges energy with the hydraulic circuit and the prime mover by flow of hydraulic fluid between the hydraulic machine and the hydraulic circuit and via movement of the rotatable shaft, wherein the hydraulic machine comprises a plurality of chamber groups, each comprising at least one working chamber in the hydraulic circuit;

at least one hydraulic actuator having at least a first actuator chamber and a second actuator chamber, each actuator chamber in the hydraulic circuit, the at least one hydraulic actuator to be used in a hydraulic work function of the hydraulic apparatus, wherein the first actuator chamber is partially defined by a first actuator working surface and the second actuator chamber is partially defined by a second actuator working surface, the second actuator working surface arranged to act at least partially in opposition to the first actuator working surface;

at least one further hydraulic fluid consumer in the hydraulic circuit and selectively fluidly connected to the hydraulic machine, wherein the at least one further hydraulic fluid consumer is to be used in a further hydraulic work function; and a valve arrangement in the hydraulic circuit for selectively routing the hydraulic fluid between the first actuator chamber and one or more of: the hydraulic machine; and the second actuator chamber, and for selectively routing the hydraulic fluid between the second actuator chamber and one or more of: the first actuator chamber; and a low pressure fluid reservoir;

wherein the determination that the mode change criteria has been met is in response to an increase in demand for the further hydraulic work function, and in response to the determination, controlling the valve arrangement to change the first actuator chamber between being fluidly connected to the hydraulic machine and fluidly isolated from the second actuator chamber, and being fluidly connected to both the second actuator chamber and the hydraulic machine; and further in response to the determination, controlling the hydraulic machine to change a flow rate of hydraulic fluid flowing through the hydraulic machine and a portion of the hydraulic circuit in fluid communication with the first actuator chamber, to thereby regulate a movement of the at least one hydraulic actuator during the control of the valve arrangement, wherein controlling the valve arrangement to change the first actuator chamber between being fluidly connected to the hydraulic machine and fluidly isolated from the second actuator chamber, and being fluidly connected to both the second actuator chamber and the hydraulic machine comprises controlling the hydraulic apparatus to isolate at least one chamber group of the hydraulic machine from the first actuator chamber of the at least one hydraulic actuator, the at least one chamber group among at least two of the plurality of chamber groups previously together in fluid communication with the first actuator chamber of the at least one hydraulic actuator.

* * * * *